UNITED STATES PATENT OFFICE.

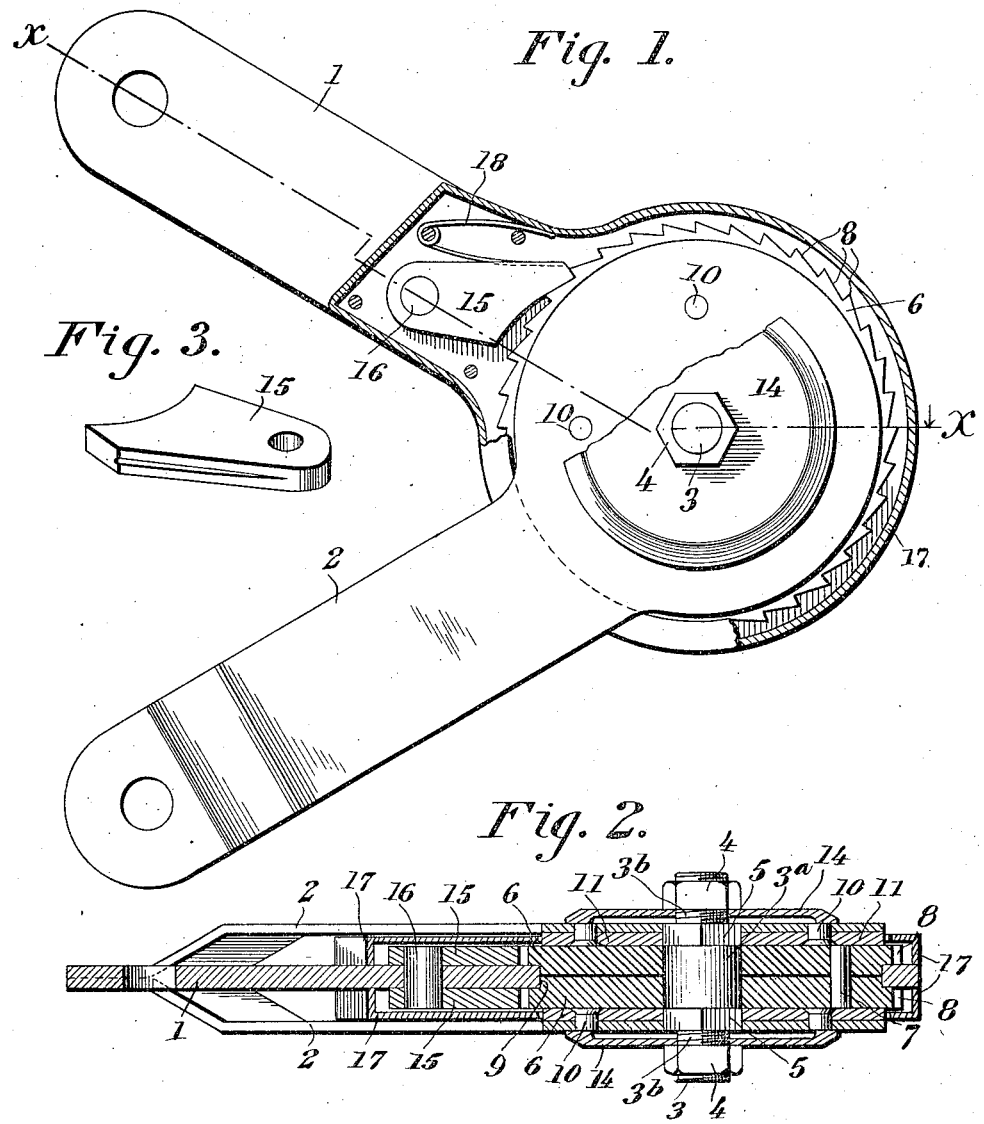

GEORGE H. DANGLEMAN, OF PHILADELPHIA, PENNSYLVANIA.

SHOCK-ABSORBER.

1,077,124.  Specification of Letters Patent.  Patented Oct. 28, 1913.

Application filed March 28, 1913. Serial No. 757,405.

*To all whom it may concern:*

Be it known that I, GEORGE H. DANGLEMAN, a citizen of the United States, residing at Philadelphia, in the county of Philadelphia and State of Pennsylvania, have invented new and useful Improvements in Shock-Absorbers, of which the following is a specification.

This invention provides an appliance for preventing the too rapid movement of a vehicle body which is usually attendant with inconvenience to the occupant and danger to the springs and other parts of the vehicle, such appliance being particularly designed to retard the rebound when a vehicle passes over an object or drops into a rut or depression.

The invention has relation to a shock absorber of the type embodying two pivotally connected members which are held in frictional engagement and are designed to restrict the movement of the vehicle body under abnormal conditions which tend to produce a violent or unusual vibration or shock.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a shock absorber embodying the invention, a portion of one of the members being broken away. Fig. 2 is a horizontal section on the line $x$—$x$ of Fig. 1. Fig. 3 is a detail perspective view of one of the dogs.

Corresponding and like parts are referred to in the following description, and indicated in all the views of the drawing, by the same reference characters.

The operating members are designated by the reference numerals 1 and 2, the member 1 consisting of a single element and the member 2 comprising companion parts which extend along opposite sides of the friction disks. The members 1 and 2 have pivotal connection at one end and the opposite end of each is adapted to be attached in any manner to the relatively movable part of the vehicle, such as the axle and frame or the parts of the vehicle springs. When in operation the members 1 and 2 have a pivotal movement.

The numeral 3 indicates an axle about which the members 1 and 2 relatively turn. This axle has its middle portion $3^a$ enlarged and made rounding and its end portions $3^b$ reduced and threaded to receive nuts 4. The intermediate portions 5 of the axle are made square or non-circular in cross section so as to prevent relative turning of the parts mounted thereon.

Two friction disks 6 are mounted upon the enlarged middle portion $3^a$ of the axle 3 and are connected by means of a pin 7 to move as one part. The friction disks 6 have outer flanges which are formed with ratchet teeth 8. The annular space 9 formed between the toothed flanges 8 receives the pivot end of the member 1 which is formed with an opening for this purpose. The toothed flanges 8 prevent lateral displacement of the member 1. Other friction disks 11 are placed against the outer sides of the friction disks 6 and are mounted upon the non-circular portions 5 of the axle so as to remain relatively stationary therewith. Studs or rivets 10 connect the disks 11 with the parts of the member 2 to hold the parts 11 and 2 in fixed relation.

Spring tension disks 14 are mounted upon the threaded ends $3^b$ of the axle 3 and are confined thereon by means of the nuts 4. The spring tension disks 14 serve to press the two sets of friction disks 6 and 11 together with a greater or less force depending upon the tension created by adjustment of the nuts 4. The inner sides of the friction disks 11 engage the outer sides of the adjacent friction disks 6. The two sets of friction disks have a relative movement in one direction only, which is so arranged as to prevent a rapid rebound in the event of the wheel of a vehicle dropping into a depression or passing over an obstruction.

The member 1 is provided upon opposite sides with dogs 15 which are arranged to engage with the teeth 8 of the friction disks 6. When the outer or free ends of the members 1 and 2 move inward the dogs 15 ride upon the teeth 8, but when the outer ends of the members 1 and 2 move outward the dogs 15 engage with the teeth 8 and effect a rotary movement of the friction disks 6. This movement is retarded to a greater or less extent depending upon the resistance offered by the frictional engagement of the surfaces in contact and the violence of the rebound, tending to separate the outer ends of the members 1 and 2. The dogs 15 are mounted upon a pin 16 which passes transversely through an opening formed in the member 1. A spring 18 coöperates with each of the dogs 15 to hold it in engagement with the teeth 8. The dogs 15 and springs 18 are inclosed by housings 17, which are secured to opposite sides of the member 1.

In the application of the invention the outer ends of the members 1 and 2 are secured in any manner to the upper and lower members of an elliptic spring or to the frame and axle of the vehicle. When the vehicle body moves downward the outer ends of the members 1 and 2 are pressed together without any resistance being offered to their movement, but when the outer ends of the members 1 and 2 move apart upon the rebound of the vehicle body the dogs 15 engage the toothed portion 8 of the friction disks 6 and cause a relative rotary movement between the two sets of friction disks 6 and 11, thereby preventing the quick motion usually experienced as a result of such rebound and overcoming the objectionable features incident thereto.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

The housings 17 are extended to inclose the toothed flanges 8 of the friction disks 6, the housings having their rim portions touching opposite sides of the member 1, as shown most clearly in Fig. 2.

Having thus described the invention what is claimed as new, is:—

A shock absorber comprising an axle having its middle portion enlarged, parts adjacent the middle portion of non-circular form in cross section and having its end portion reduced and threaded, friction disks rotatably mounted upon the middle portion of the axle and formed with ratchet teeth at their outer edges, other friction disks mounted upon the non-circular portions of the axle and in contact with the friction disks mounted upon the middle part of such axle, an operating member provided at its sides with dogs to engage the teeth of the middle friction disks, a second operating lever comprising spaced parts which have connection with the outer friction disks, spring tension disks mounted upon the threaded ends of the axle, and nuts upon the threaded ends of the axle for confining the parts and varying the tension of the said spring tension disks.

In testimony whereof I affix my signature in presence of two witnesses.

GEORGE H. DANGLEMAN.

Witnesses:
 HELEN G. DALEY,
 NORMAN J. SMITH.